3,045,000
**STABILIZATION OF POLYCHLOROTRIFLUORO-
ETHYLENE WITH CHLORINE GAS**
Roy R. Divis, 1650 Mayfair, Westchester, Ill.
No Drawing. Filed May 20, 1959, Ser. No. 814,392
5 Claims. (Cl. 260—92.1)

This application relates to improvements in the production of polychlorotrifluoroethylene resins. More particularly, it relates to the stabilization of polychlorotrifluoroethylene to the effects of the temperatures used in fabrication thereof.

Polychlorotrifluoroethylene is a crystalline polymer that becomes soft and somewhat workable at about 400° F. The viscosity of the polymer at and above this temperature is high and the decrease of viscosity with increase of temperature is relatively gradual. Thus, the temperatures used in fabricating polychlorotrifluoroethylene are necessarily high. For example, compression molding is commonly carried out at 475–500° F., injection molding at 550° F., and extrusion at 600° F. A typical temperature program for an extruder would be: barrel—510° F., head—540° F., and die—620° F. Many useful articles such as gaskets, tubing, valve diaphragms, insulators and pipe can be fabricated from this polymer.

The fabrication of polychlorotrifluoroethylene into useful articles at these high temperatures causes a degradation of molecular weight and the appearance of a brown discoloration. This discoloration is particularly disadvantageous in many uses, such as in transparent corrosion resistant windows for apparatus and reactors. The degradation of molecular weight is disadvantageous in that toughness and impact resistance as well as optical clarity are reduced. The degree of discoloration is often not uniform from batch to batch, although the degradation of molecular weight is fairly uniform. Further, the color of a single batch may vary as the fabrication operation, such as extrusion, progresses. Such a phenomenon results in a series of fabricated items that are not uniform in color, which is undesirable from the viewpoint of the customer, mostly because of eye and sales appeal. Color is considered of such great importance in some applications that certain specifications, such as those used in missiles and rocketry, describe acceptable color limits in some detail.

Previous attempts to correct the problem have been based on the addition of inorganic or organic materials to act as molecular weight and color stabilizers. However, such additives will have an adverse effect upon the useful properties of polychlorotrifluoroethylene, such as clarity, electrical constants and chemical resistance. This effect renders the polymer unsuitable for many uses, such as chemical windows, electronic components, and resistant pipe and tank linings.

It has now been found that discoloration and molecular weight degradation of polychlorotrifluoroethylene during fabrication can be eliminated for all practical purposes by a preliminary treatment with elemental chlorine gas.

Thus, an object of this invention is to provide an improved polychlorotrifluoroethylene that will not discolor or significantly degrade when fabricated into useful articles.

Another object of this invention is to provide an improved polychlorotrifluoroethylene that will not discolor or significantly degrade when fabricated into useful articles, and yet will contain no additives which might affect some physical property of the fabricated article, usually the chemical resistance, tensile performance and electrical properties such as dipole amount and insulation resistance.

Another object of this invention is to provide fabricated polychlorotrifluoroethylene articles which are free from discoloration.

Another object of this invention is to provide fabricated polychlorotrifluoroethylene articles that retain their desirable properties, such as clarity, toughness, electrical constants and chemical resistance.

Another object of this invention is to provide a process for the production of improved polychlorotrifluoroethylene that will not be discolored or degraded during fabrication.

Further objects and advantages of this invention will be apparent to those skilled in the art from the following description and illustrative examples.

In accordance with this invention, polychlorotrifluoroethylene is treated with chlorine gas under suitable conditions of time, temperature and pressure. The chlorine gas may be used alone or mixed with relatively inert gases such as helium or nitrogen. In a preferred embodiment of my invention, polychlorotrifluoroethylene, in a form exposing a large surface area, such as powder or porous lumps, is maintained in an atmosphere of chlorine gas at a temperature of 60–80° F. and atmospheric pressure for one hour. The treated polymer is then heated at 300° F. for 48 hours to remove excess absorbed but uncombined and unreacted chlorine. The product may then be fabricated in the usual manner.

Polychlorotrifluoroethylene manufactured by any method may be treated by this process. One method of manufacturing this polymer is by use of tertiary-perfluorobutyl peroxide as catalyst. The catalyst and liquefied chlorotrifluoroethylene are mixed and allowed to stand at 0–19° F. for seven days. Another method is to mix equal parts of chlorotrifluoroethylene, water and small amounts of hydrogen peroxide in an agitated reactor, and expose the agitated mixture to ultraviolet light for two to four days. A third method is to expose liquefied chlorotrifluoroethylene maintained at, for example, 50° F. to gamma radiation as from a cobalt-60 source for seven days.

The true reactions or mechanisms by which treatment of polychlorotrifluoroethylene with chlorine gas, in accordance with the present invention, results in stabilization of color and molecular weight to heat is not known at present. I believe that the stabilization is due to the reaction of chlorine with residual reactive sites or unstable species on the polymer chain. Such reactive sites or unstable species could easily initiate discoloration and molecular weight degradation of the polymer by heat.

If the polychlorotrifluoroethylene is manufactured by the usual peroxide catalyst process, such unstable species would be located at the polymer chain ends because of the catalyst fragments attached that acted as polymer chain initiators and terminators. The unstable species could also be located along the chain itself, and could be due to trapped free radicals or relatively unstable radicals, such as the hydroxyl group. Such reactive sites might be caused by side reactions, such as dehalogenation or halogen abstraction, particularly at the carbon-chlorine bonds of the polymer.

Polychlorotrifluoroethylene manufactured by a process initiated with ultraviolet light and a catalyst may possess trapped free radicals or unstable species due to degradation of the polymer by the ultraviolet light in addition to those produced by catalyst effects and side reactions. Such an effect is shown by some plastics that age, stiffen and crack when exposed to sunlight for some itme.

Polymer that has been manufactured by a bulk process initiated by gamma radiation probably has trapped free radicals as the major unstable species, since other reactants are not present except as minor impurities. It has been shown by other investigators that such trapped free radicals are reactive after six months' storage in air.

The resin preferred for treatment in the process of the present invention is one that has a large surface area so that the time of exposure to chlorine is held to a minimum. One method of obtaining such a resin is by grinding to a fine powder in a commercially available grinder, such as a micro-pulverizer. Polychlorotrifluoroethylene manufactured by the gamma radiation technique is particularly suitable for the treatment with chlorine gas. The resin obtained by the gamma radiation method has a spongelike character, so that a very large surface area is available for contact with chlorine gas.

Incomplete removal of excess absorbed chlorine before fabrication will have a deleterious effect upon the properties of the fabricated article. For example, molecular weight degradation and discoloration are increased if residual chlorine is present. Thus, the essentially complete removal of excess chlorine is necessary to the practice of this invention.

Although the treatment of polychlorotrifluoroethylene with chlorine may be carried out within the temperature range −29° F. to 350° F. the preferred temperature of treatment is 40° F. to 90° F. Temperatures below the preferred range are more difficult and costly to maintain on a commercial scale, and temperatures above the preferred range result in increased absorption of chlorine gas, which requires a long processing period for satisfactory removal of the excess absorbed chlorine.

Any pressure that maintains the chlorine as a gas may be used in the practice of this invention as long as sufficient chlorine is present to completely react with the unstable species entrapped within the polychlorotrifluoroethylene. It has been found that pressures of chlorine less than 100 mm. of mercury will not give complete reaction with the unstable species of polychlorotrifluoroethylene. The preferred operating pressure range is 350–800 mm. of mercury. Higher pressures, although effective, are not preferred because greater absorption of chlorine by polychlorotrifluoroethylene results. Thus, long processing periods are required for satisfactory removal of the residual chlorine.

Since the rate of reaction of chlorine with unstable species present in polychlorotrifluoroethylene is rapid, the contact time of chlorine with resin is controlled only by the rate of mixing and diffusion of chlorine and polymer. Thus, contact time is relatively short for porous powder, such as that produced by the gamma ray irradiation process, and long for nonporous granules, such as that produced by sintering of powder to a solid mass followed by chopping. In the best practice of this invention, the contact time is chosen to obtain complete treatment of the unstable species within the polychlorotrifluoroethylene and yet to reduce chlorine absorption to a minimum. Although any contact time greater than one minute may be used, the preferred contact time is five minuates to two hours.

The removal of excess absorbed chlorine must be essentially complete so that a satisfactory product is obtained. If this removal is incomplete, any molecular weight degradation and discoloration that occurs during fabrication will be increased. The removal of excess absorbed chlorine is accomplished by heating the treated polymer, preferably under vacuum, until the excess gas has been driven off. The temperature employed is within the range of from about 150° F. to about 380° F., and the preferred temperature range is from about 300° to about 350° F. The time of heating is usually within the range of from about one hour to about ten days, although the preferred time of heating in the practice of this invention is from about 48 to about 96 hours. Any pressure that allows the volatile products to be removed during the heating may be used. Normally, this pressure will be within the range 0.1 mm. of mercury to 100 pounds per square inch. Pressures less than 0.1 mm. of mercury, although quite effective, can be obtained on a production scale only with great difficulty and expense. Pressures higher than about 100 pounds per square inch prevent the complete removal of the volatile materials. The preferred pressure range is 0.1 mm. of mercury to 16 pounds per square inch. Any combination of time of heating, temperature and pressure that results in satisfactory removal of excess absorbed chlorine is within the scope of this invention.

In the practice of this invention, any apparatus may be used that maintains contact between the chlorine gas and the polychlorotrifluoroethylene at the desired conditions of time, temperature and pressure. One such apparatus is a sealed chamber similar to an oven in which the polychlorotrifluoroethylene spread in trays, is placed. This chamber may or may not be heated. If it is heated, the treatment and subsequent elimination of excess chlorine can be carried out in the same apparatus. Other suitable equipment is a conical-drier blender or a rotary kiln. As above, the entire sequence of operations can be carried out in the same apparatus if sufficient heat is provided for the excess chlorine elimination step. An advantage of the rotary kiln is that it is adaptable to a continuous method of treatment of polychlorotrifluoroethylene.

The time elapse between manufacture of the resin and treatment with chlorine has no appreciable effect upon the results obtained. Both freshly produced polychlorotrifluoroethylene and polymer that has been stored for a considerable length of time, such as two years, will be improved by treatment with chlorine. The chlorine treatment process may be included in the polymer manufacturing process easily and economically. For example, after the polychlorotrifluoroethylene has been produced by any method and the bulk of the excess monomer has been removed, the solid polymer reaction product is then reduced in size by the usual means of grinding or pulverizing and treated with chlorine. The removal of excess chlorine is conducted in the manner described above since the reaction products of chlorine with excess monomer and polymerization side-products are also removed.

The effect of the treatment of the solid polychlorotrifluoroethylene reaction product with chlorine on degradation and discoloration was measured by determination of flow index and visual discoloration before and after heating by a standard procedure. In this standard heating procedure, ten grams of the polymer were placed in a test tube of 0.75 inch diameter and heated in a Wood's metal bath at 570–572° F. for one hour. After cooling, the flow index of the product was determined as described in ASTM designation: D1430–56T. The flow index of the sample before heating was also determined. Flow index is regarded as a measure of molecular weight by those skilled in the art. The material that was extruded from the flow index instrument was observed visually against a white background for discoloration.

Transmittance spectra were also used in some cases as a measure of discoloration. In this test, 30 grams of sample was molded between #8 mirror finish, stainless steel plates of the thickness 0.031 inch. The sample was placed between the stainless steel plates and the assembly inserted in an electrically heated platen press. The press platens were maintained at 550° F. The press platens and charge were closed and sufficient pressure was maintained to follow the rate of melting of the polymer for thirty minutes. The pressure was then raised to 1,000 pounds per square inch gauge and maintained for one minute. The charge assembly was then removed from the press and immediately quenched in water whose temperature did not exceed 60° F. The final dimension of the molded sheet was 0.062±0.001 inch, which was obtained by placing spacer blocks between the stainless steel plates. Samples were cut from this sheet and the transmittance spectrum was determined in the usual manner using a Beckmann model DU spectrophotometer.

The invention and its practice are further illustrated by the following examples:

*Example 1*

Into a 500 ml., round-bottom flask connected to a pressure indicator, vacuum pump and chlorine source, and immersed in a constant temperature bath at 77° F., was charged 82 grams of powdered polychlorotrifluoroethylene. The system was evacuated to a pressure of about 0.1 mm. of mercury, then chlorine was added to a pressure of 760 mm. of mercury. A pressure drop of 170 mm. of mercury was observed over a contact period of 80 minutes, although most of this pressure drop occurred within the initial five minutes of contact time. The polymer was transferred to a beaker and heated at 300° F. for 67 hours for removal of excess absorbed chlorine. A test sheet was molded for spectrophotometric color observation. At a wave length of 320 millimicrons, this sheet gave a percent transmittance value of 63.8%. A sheet molded from untreated polychlorotrifluoroethylene from the same lot and in the same manner gave a percent transmittance value of 39.6%.

*Example 2*

Into a 500 ml., three-necked, round-bottom flask fitted with a thermometer, vacuum pump, pressure indicator and chlorine source, and immersed in a constant temperature bath, was placed 75 grams of pulverized, porous polychlorotrifluoroethylene. The system was evacuated to a pressure of about 0.1 mm. of mercury, then chlorine was added to a pressure of 560 mm. of mercury. The polymer temperature before chlorine addition was 75° F. and after a contact time of 5 minutes was 77° F. Then the polymer temperature slowly dropped to 75° F. over an additional contact time of 145 minutes. The change of pressure with contact time was—

| Contact time (minutes): | Pressure, mm. Hg |
| --- | --- |
| 0 | 560 |
| 5 | 414 |
| 30 | 364 |
| 60 | 346 |
| 90 | 338 |
| 120 | 330 |
| 150 | 322 |

The treated polymer was transferred to a beaker and heated at 300° F. for seven days for removal of excess absorbed chlorine. The flow index of the polychlorotrifluoroethylene before treatment was 3.0 mg./min. and after treatment was 3.6 mg./min. The flow index after heating at 570° F. for one hour of untreated polychlorotrifluoroethylene was 104 mg./min. and that of treated polymer was 46 mg./min. The untreated polychlorotrifluoroethylene had a brown color after heating at 570° F. for one hour, but the treated polymer showed no discoloration.

*Example 3*

The procedure of Example 2 was used in this experiment except that the initial chlorine pressure was 370 mm. of mercury. The flow index of the product polymer was 4.4 mg./min. and, after heating at 570° F. for one hour was 53 mg./min. The treated polymer showed no discoloration after heating.

*Example 4*

The procedure of Example 3 was used in this experiment except that the polymer temperature was 180° F. The flow index of the product polymer was 3.7 mg./min. and, after heating for one hour at 570° F., was 94 mg./min. The treated polymer showed no discoloration after heating.

*Example 5*

The apparatus described in Example 1 was charged with 250 grams of polychlorotrifluoroethylene and filled with chlorine at a pressure of 760 mm. of mercury. The contact time was 120 minutes and the temperature was 210° F. After removal from the reactor, the treated polymer was divided into three equal portions. Portions A, B, and C were heated at 300° F. for 2, 24, and 96 hours, respectively. Test sheets for spectrophotometric color observation could not be molded from portions A and B, but could be molded from portion C. It was observed visually that portions A and B were discolored but portion C showed no discoloration.

*Example 6*

A reactor made from glass-lined pipe of the dimensions 6 inches diameter and 36 inches length fitted with glass-lined flanges and connected to a vacuum pump, pressure indicator and chlorine source was charged with 10 pounds of polychlorotrifluoroethylene. The reactor was mounted on motorized rollers to allow rotation and was enclosed in an insulated case so that heat could be supplied by means of a hot air gun. The reactor was then rotated and heated for 1.5 hours to heat the polymer to the desired temperature. The reactor was then evacuated to a pressure of about 50 mm. of mercury, then filled with chlorine to a pressure of 760 mm. of mercury. The reactor with its polymer charge was then rotated and heated for two hours. The temperature variation along the reactor was 170–250° F. The reactor was cooled, the charge transferred to trays and heated in an oven for five days at 300° F. The flow index of the treated polychlorotrifluoroethylene was 7.8 mg./min. and after heating at 570° F. for one hour was 32 mg./min. The flow index of the untreated polychlorotrifluoroethylene was 8 mg./min. and after heating at 570° F. for one hour was 60 mg./min. The treated polychlorotrifluoroethylene showed no discoloration after heating at 570° F. for one hour, whereas the untreated polymer was discolored after the same heating cycle.

I claim:

1. A process for stabilizing solid polychlorotrifluoroethylene reaction product, as formed, against color development and molecular weight degradation at fabrication temperatures which comprises exposing said product, prior to subjecting it to fabrication temperature, to chlorine gas at a chlorine pressure in excess of 100 mm. of mercury until substantially all unstable specie content has been thereby eliminated, and then heating the treated product to remove excess absorbed chlorine content.

2. A process for stabilizing polychlorotrifluoroethylene resin against color development and molecular weight degradation caused by fabrication temperatures, which comprises exposing polychlorotrifluoroethylene, prior to subjecting it to fabrication temperature, to chlorine gas at a temperature within the range of from about −29° F. to about 350° F., and a chlorine pressure greater than 100 mm. of mercury, for a period greater than one minute, and then heating the treated product to remove excess absorbed chlorine content.

3. A process for stabilizing polychlorotrifluoroethylene resin against color development and molecular weight degradation caused by fabrication temperatures, which comprises exposing polychlorotrifluoroethylene, prior to subjecting it to fabrication temperature, to chlorine gas at a chlorine pressure in excess of 100 mm. of mercury, then removing excess absorbed chlorine from the treated polychlorotrifluoroethylene by heating it at a temperature of from about 150° F. to about 380° F. for a period of from about one hour to about 240 hours, and at a pressure of from about 0.1 mm. of mercury to about 100 pounds per square inch.

4. A process for stabilizing polychlorotrifluoroethylene resin against color development and molecular weight degradation caused by fabrication temperatures, which comprises exposing particles of polychlorotrifluoroethylene, prior to subjecting it to fabrication temperature, to chlorine gas at a temperature of from about 40° F. to about 90° F., and a chlorine pressure of from about 350 mm. of mercury to about 800 mm. of mercury and for a period of from about five minutes to about 120 minutes, and then removing the excess absorbed chlorine from the polymer by heating it at a temperature of from about 300° F. to about 350° F., a pressure of from about 0.1 mm. of mercury to about 16 pounds per square inch, and for a period of from about 48 hours to about 96 hours.

5. A polychlorotrifluoroethylene resin stabilized against color development and molecular weight degradation at fabrication temperatures in accordance with the process of claim 1.

References Cited in the file of this patent

UNITED STATES PATENTS

| | | |
|---|---|---|
| 2,392,389 | Joyce | Jan. 8, 1946 |
| 2,497,046 | Kropa | Feb. 7, 1950 |
| 2,902,477 | Fischer et al. | Sept. 1, 1959 |

OTHER REFERENCES

Frey et al.: Ind. Eng. Chem. 42 (No. 11), 2314–17 (1950). (Copy in S.L.)

Wall et al.: Journal of Research of the National Bureau of Standards, vol. 56, No. 1, pages 27–34, January 1956. (Copy in Scientific Library.)